(12) United States Patent
Pinglikar et al.

(10) Patent No.: US 9,378,159 B2
(45) Date of Patent: Jun. 28, 2016

(54) DEADLOCK DETECTION AND RECOVERY IN SAS

(71) Applicant: LSI CORPORATION, San Jose, CA (US)

(72) Inventors: Vidyadhar Pinglikar, Pune (IN); Shankar T. More, Pune (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 117 days.

(21) Appl. No.: 14/173,434

(22) Filed: Feb. 5, 2014

(65) Prior Publication Data

US 2015/0033074 A1 Jan. 29, 2015

(30) Foreign Application Priority Data

Jul. 23, 2013 (IN) .......................... 3292/CHE/2013

(51) Int. Cl.
*G06F 11/00* (2006.01)
*G06F 13/00* (2006.01)
*G06F 11/07* (2006.01)

(52) U.S. Cl.
CPC ............ *G06F 13/00* (2013.01); *G06F 11/0727* (2013.01); *G06F 11/0751* (2013.01); *G06F 11/0757* (2013.01); *G06F 11/0793* (2013.01)

(58) Field of Classification Search
CPC . G06F 13/387; G06F 13/409; G06F 11/0757; G06F 11/0793
See application file for complete search history.

(56) References Cited

U.S. PATENT DOCUMENTS

| | | | | |
|---|---|---|---|---|
| 7,133,405 B2 * | 11/2006 | Graham | .............. | H04L 12/5693 370/392 |
| 7,360,119 B1 * | 4/2008 | Stenfort | .............. | G06F 11/0745 714/43 |
| 7,584,319 B1 * | 9/2009 | Liao | ..................... | G06F 13/4031 370/357 |
| 7,644,168 B2 | 1/2010 | Greiff | | |
| 2011/0283150 A1 | 11/2011 | Konishi | | |
| 2011/0320706 A1 * | 12/2011 | Nakajima | ........... | G06F 11/0793 711/114 |
| 2012/0246521 A1 | 9/2012 | Washiya | | |

* cited by examiner

*Primary Examiner* — Charles Ehne (57) ABSTRACT

Systems and methods herein provide for managing devices through a Serial Attached Small Computer System Interface (SAS) expander. The SAS expander includes a processor adapted to detect deadlock conditions in a SAS environment. In one embodiment, the SAS expander is operable to detect an Open Address Frame associated with a connection request from a source device to a destination device. The Open Address Frame includes a source address and a destination address associated with the source device and the destination device, respectively. The expander receives an arbitration in progress status on a partial pathway that is associated with the connection request. The expander is further operable to modify the Open Address Frame to include a deadlock indicator and forward the modified Open Address Frame on the partial pathway. When the modified Open Address Frame is received, the expander initiates pathway recovery upon determination that the deadlock indicator is valid.

20 Claims, 7 Drawing Sheets

| Byte/Bit | 7 | 6 | 5 | 4 | 3 | 2 | 1 | 0 |
|---|---|---|---|---|---|---|---|---|
| 0 | Initator Port | Protocol | | | Address Frame Type | | | |
| 1 | Features | | | | Connection Rate | | | |
| 2 | Initiator Connection Tag | | | | | | | |
| 3 | Initiator Connection Tag | | | | | | | |
| 4 - 11 | Destination SAS Address | | | | | | | |
| 12 - 19 | Source SAS Address | | | | | | | |
| 20 - 27 | Origin SAS Address | | | | | | | |
| 28 - 31 | CRC | | | | | | | |

DEADLOCK DETECTION AND RECOVERY IN SAS

This document claims priority to Indian Patent Application No. 3292/CHE/2013 (filed on Jul. 23, 2013) entitled DEADLOCK DETECTION AND RECOVERY IN SAS, which is hereby incorporated by reference.

FIELD OF THE INVENTION

The invention generally relates to deadlock detection of devices in a Serial Attached Small Computer System Interface (SAS) environment.

BACKGROUND

Some data systems employ multiple target devices (e.g., storage devices) which may be accessed by initiators of host systems through one or more expanders in order to read and write data. The expanders interconnect the target devices and the initiators via physical interfaces, or "Phys", to increase the number of target devices that the initiators may access. A protocol such as SAS uses a series of commands to communicate between devices in the system. Sometimes, a transmission of commands is interrupted in a way such that a receiving device is unable to interpret and respond to a transmitting device. This may result in a situation known as deadlock where the receiving device and transmitting device are no longer able to understand and communicate with one another. Path recovery is used within a SAS topology to avoid deadlock by deterministically choosing which partial pathway(s) to tear down to allow at least one connection to complete. However, the path recovery process begins after an expiration of a partial pathway timeout which inherently delays the process of deadlock detection and slows system performance. Furthermore, pathway recovery is sometimes initiated even when true deadlock conditions do not exist.

SUMMARY

Systems and methods presented herein provide for managing connections between devices in a Serial Attached Small Computer System Interface (SAS) environment. The SAS expander includes a processor adapted to detect deadlock conditions in a SAS environment. In one embodiment, the SAS expander is operable to detect an Open Address Frame associated with a connection request from a source device to a destination device. The Open Address Frame includes a source address and a destination address associated with the source device and the destination device, respectively. The expander receives an arbitration in progress status on a partial pathway that is associated with the connection request. The expander is further operable to modify the Open Address Frame to include a deadlock indicator and forward the modified Open Address Frame on the partial pathway. When the modified Open Address Frame is received, the expander initiates pathway recovery upon determination that the deadlock indicator is valid.

The various embodiments disclosed herein may be implemented in a variety of ways as a matter of design choice. For example, the embodiments may take the form of computer hardware, software, firmware, or combinations thereof. Other exemplary embodiments are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
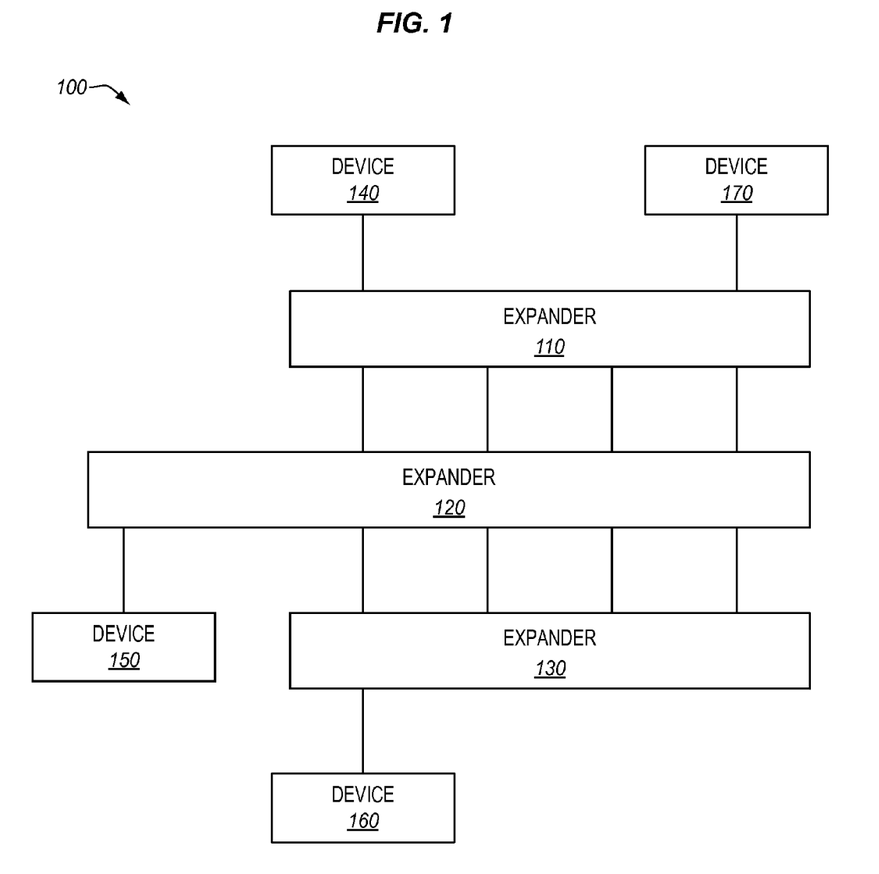
FIG. 1 is a block diagram of an exemplary SAS architecture 100.

FIG. 1 is a block diagram of an exemplary SAS architecture 100 comprising a plurality of expanders 110/120/130, each attached to one or more device(s) 140/150/160/170. The devices 140/150/160/170 may include initiator/hosts and/or target devices/drives. The expanders 110/120/130 are operable to manage connections between the devices 140/150/160/170 and are further operable to detect potential deadlock conditions in the SAS architecture 100. Deadlock is a condition in which two or more processes (e.g., connection requests) are waiting on each other to complete, resulting in none of the processes completing.

Each expander 110/120/130 includes a plurality of ports (not shown) and associated phys for connecting to various devices 140/150/160/170 and other expanders. In addition, each expander 110/120/130 may include an expander connection manager (ECM) for allowing pathways to be built between any two phys and an expander connection router (ECR) for determining routing connections between different phys. An ECM maps a destination SAS address in a connection request to a destination phy and also arbitrates and assigns or denies path resources for connection requests.

In order to establish a connection, a source device (i.e., the device from which a service delivery transaction originates) makes a request to establish a connection by transmitting an open address frame (OAF) to a destination device (i.e., the device to which a service delivery transaction is addressed). An OAF typically contains a destination address, a source address, and other attributes that help the expanders 110/120/130 route data in the SAS architecture 100.

The connection request is routed through one or more of the expanders 110/120/130, which extract the source SAS address and destination SAS address in the OAF. When an expander 110/120/130 receives an OAF, it compares the destination address to the addresses of the devices to which each of its phys is attached. For all phys which have table routing attributes, the expander 110/120/130 compares the destination address to all the enabled routed addresses in the route table. The route table includes respective relationships between each phy and an address of its associated device, which is typically reported during discovery.

A connection is established when an OPEN_ACCEPT command is sent by the destination device to the source device in response to the connection request made by the source device. Once established, the connection temporarily allows communication for one protocol (e.g., Serial ATA Tunneled Protocol (STP), Serial Management Protocol (SMP), and/or Serial SCSI Protocol (SSP)). The connection includes a set of physical links between a source phy and a destination phy, which is referred to as a pathway.

A partial pathway occurs when an OAF has been delivered along a pathway to a destination phy but the destination phy has not yet responded to the connection request. As will be further described below, connection requests from multiple devices 140/150/160/170 can reach an expander 110/120/130 at the same time. When there are multiple source phys (and associated source devices) requesting to be connected to the same destination phy, the expander 110/120/130 decides between requests competing for the same resources in a process known as arbitration. An Arbitration in Progress (AIP) primitive is transmitted by the expander 110/120/130 to the source device after a connection request to indicate that the connection request is being processed and to specify the status of the connection request. AIPs may be used by the expanders 110/120/130 to communicate the state of arbitration to devices 140/150/160/170 and/or other expanders.

The expander 110/120/130 responds to a connection request by returning an AIP to the source phy when expander 110/120/130 is internally arbitrating for access to a destination phy. A phy on the expander 110/120/130 generates Phy Status (Blocked on Partial) to the ECM in response to an incoming open request when it has also received AIP for its outgoing request. Additionally, the ECM in expander 110/120/130 sends arbitrating confirmations to its connected phys when the ECM is waiting on a partial pathway. For example, Arbitrating (Waiting on Partial) is confirmation that the ECM is waiting on a partial pathway. Arbitrating (Blocked on Partial) is confirmation that the ECM is waiting on a blocked partial pathway.

Deadlock in the SAS architecture may occur when both source devices and destination devices are requesting connection for each other over multiple expanders 110/120/130. In such instances, pathway recovery is used by expanders 110/120/130 to abort connection requests in order to prevent or cure deadlock. The expander(s) may perform pathway recovery by determining which partial pathway(s) to tear down to allow at least one connection to complete.

In one embodiment, each of the expanders 110/120/130 are operable to send a modified OAF, referred to as a Deadlock Open Address Frame (DOAF), on a partial pathway which has an outgoing connection request and is generating phys status Blocked on Partial for incoming connection request. The Blocked on Partial status triggers the start of deadlock detection by sending the DOAF instead of starting the partial pathway timeout timer. The expander 110/120/130 sends the DOAF on the outgoing connection path of the device that is directly attached to a phy on that expander 110/120/130.

In one embodiment, the DOAF includes a deadlock indicator, a source address, and a destination address and is forwarded through the partial pathway of a connection loop. The deadlock indicator may include an address that is set to the address of the source device. When an expander 110/120/130 that receives the DOAF is directly attached to the destination device associated with the destination address in the DOAF, it updates the source and destination addresses in the DOAF with a pending source address and a pending destination address of a pending connection request associated with that expander 110/120/130. The expander 110/120/130 forwards the updated DOAF through the partial pathway. When the DOAF is received at the expander 110/120/130 that originally generated the DOAF, the expander 110/120/130 determines whether the address of the deadlock indicator matches the destination address in the DOAF. When a match exists, deadlock is confirmed and the deadlock recovery can be initiated without waiting for a partial pathway timeout. However, when the addresses do not match, false deadlock conditions are confirmed and the expander 110/120/130 may avoid unnecessary recovery processes.

The expanders 110/120/130 are SAS expanders operable to link initiators to target devices via the SAS protocol. The expanders 110/120/130 can be any device, system, software, or combination thereof operable to connect the devices 140/150/160/170 (as well as other expanders) to form a data network, or "switched fabric" via the SAS protocol. One example of the expanders 110/120/130 is a wide port SAS expander. Such systems can be found in Redundant Array of Independent Disks (RAID) storage systems and other data storage networks employing disk drives.

The devices 140/150/160/170 may include initiator/hosts and/or target devices/drives. Target devices are any devices capable of connecting with initiators through the expanders 110/120/130 and operable to respond to read and write requests generated by the initiators. Examples of the target devices include computer disk drives and other storage devices. Phys comprise any combination of hardware, software, firmware, and other associated logic capable of operating as physical transceivers between the elements disclosed herein. The initiators may be configured in separate host systems or in a single host system as part of a redundancy implementation with the host system. Each initiator may include a storage controller, or Host Bus Adapter (HBA), that processes host Input/Output (I/O) operations that are routed or otherwise switched (e.g., via the switched fabric) to communicate with the target devices.

Figure 2:
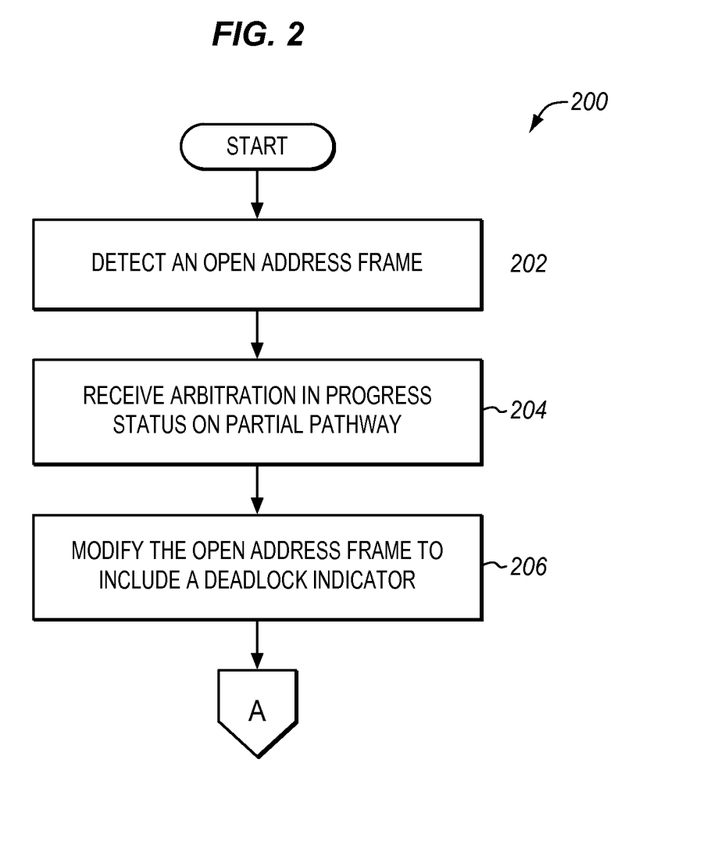
FIG. 2 is a flowchart describing an exemplary method of generating a modified Open Address Frame in the SAS architecture of FIG. 1.
Figure 3:
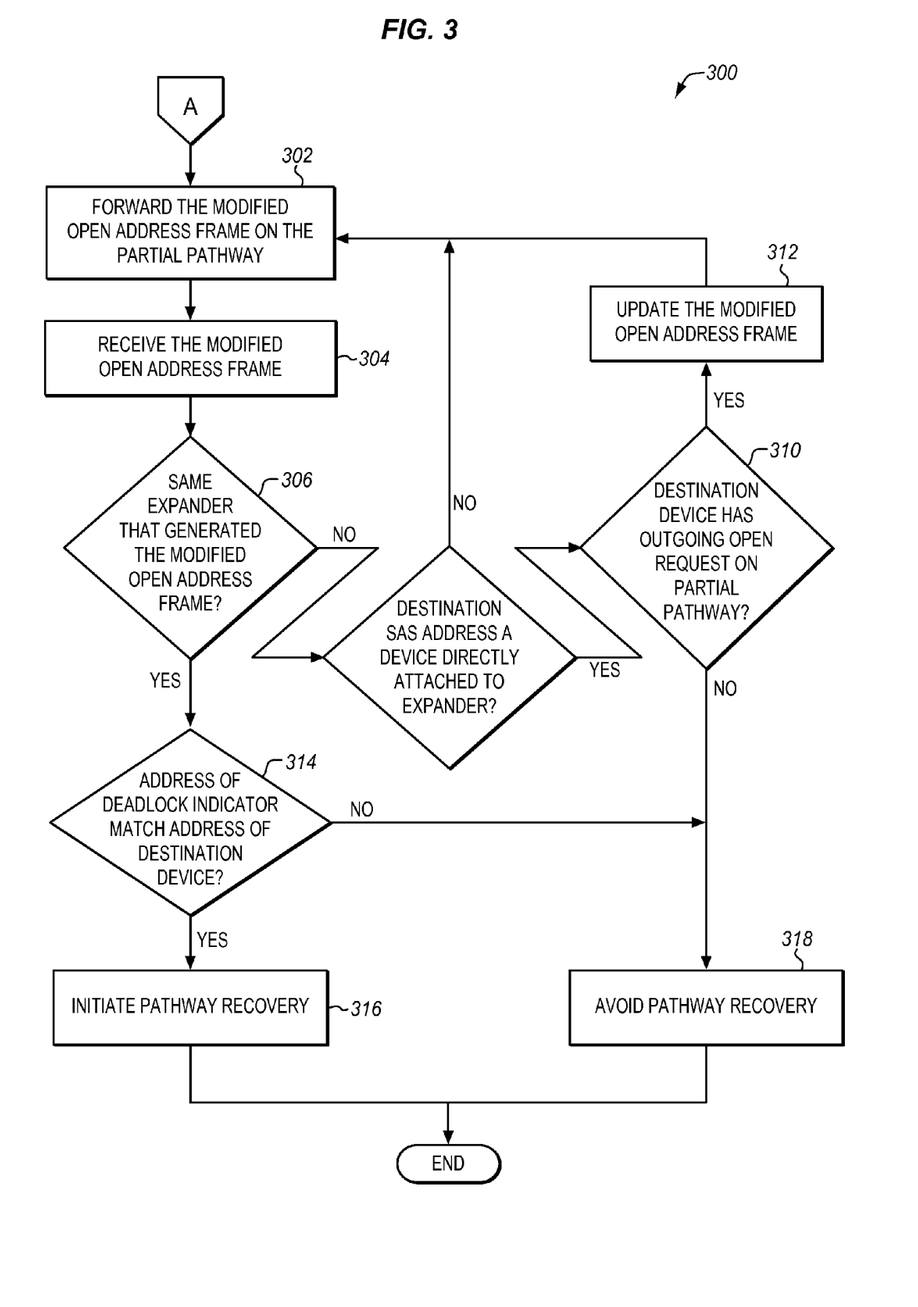
FIG. 3 is a flowchart describing an exemplary method of detecting deadlock conditions in the SAS architecture of FIG. 1.

Discussion of the expanders 110/120/130 and detection of deadlock conditions will now be directed to the flowcharts of FIG. 2 and FIG. 3. It should be noted that, while the SAS architecture 100 is illustrated with a certain number of devices and expanders, the embodiment is not intended to be limited to such. Rather, FIG. 1 is merely intended to concisely illustrate certain principles of the SAS architecture 100 and the various operations of the expanders 110/120/130. The steps of the flowcharts described herein are not all inclusive and may include other steps not shown. The steps described herein may also be performed in an alternative order.

FIG. 2 is a flowchart describing an exemplary method 200 for generating a modified Open Address Frame to assist in deadlock detection and recovery. The method of FIGS. 2 and 3 may be operable in a SAS expander such as expanders 110/120/130 described above with regard to FIG. 1. Assume for the sake of this embodiment that the SAS architecture 100 is operational and that discovery of the devices 140/150/160/170 has been performed. As the SAS architecture 100 is operational, the expanders 110/120/130 route connection requests between source devices (i.e., the device from which a service delivery transaction originates) and destination devices (i.e., the device to which a service delivery transaction is addressed).

At step 202, the expander 110/120/130 detects an OAF. As discussed above, the OAF is sent by a source device to request a connection with a destination device and includes a source address and destination address associated with the source device and the destination device, respectively. In one embodiment, the expander 110/120/130 stores the OAF in a memory location associated with the expander 110/120/130.

At step 204, the expander 110/120/130 receives an AIP status on a partial pathway. In one embodiment, a phy on the expander 110/120/130 generates a Blocked on Partial phy status to the ECM of the expander 110/120/130 in response to an incoming open request when it has also received AIP for its outgoing open request. In other words, the expander 110/102/130 receives AIP from another expander for the OAF in step 202 and subsequently generates a Blocked on Partial status in response to an incoming request. In one embodiment, the Blocked on Partial status acts as a trigger condition to start the deadlock detection mechanism.

Then, at step 206, the expander 110/120/130 modifies the OAF. The modified OAF may be referred to as a Deadlock Open Address Frame (DOAF) since it assists in deadlock detection and recovery. The DOAF includes a source address and a destination address that are set to the source and destination addresses in the currently forwarded OAF that is waiting for an open response (e.g., the OAF in step 202 which is waiting on a partial pathway as determined by the expander 110/120/130 in step 204). The DOAF also includes a deadlock indicator which will, at a subsequent point in time, assist the expander in determining whether deadlock conditions exist. In one embodiment, the deadlock indicator is an address (referred to herein as an origin address) set to the address of the source device that is waiting for a response to its connection request (i.e., OAF of step 202). The expander 110/120/130 may generate the DOAF by replacing unused bytes in the OAF with the origin address.

Once the DOAF is generated, the expander 110/120/130 proceeds to FIG. 3, which is a flowchart describing an exemplary method 300 for detecting deadlock conditions in a SAS environment. At step 302, the expander 110/120/130 forwards the DOAF on the partial pathway. As discussed above, the DOAF includes at least a source address, a destination address, and a deadlock indicator. The DOAF is forwarded through the partial paths of the possible connection loop in accordance with the current destination address in the DOAF. Once the DOAF is generated, it may be forwarded on the phy that is waiting for an open response (i.e., the phy that has received AIP for its outgoing connection request in step 202). The DOAF may be forwarded in response to a Blocked on Partial pathway status as described above.

At step 304, the forwarded DOAF is received at the next expander 110/120/130. The expander 110/120/130 that receives the DOAF next determines whether the DOAF was generated by that expander 110/120/130 at step 306. In one embodiment, the expander 110/120/130 determines if it generated the DOAF by checking if the origin address (i.e., deadlock indicator) in the DOAF is associated with a device that is directly attached to the expander 110/120/130.

When the expander 110/120/130 that receives the DOAF did not generate the DOAF, the method proceeds to step 308 where it next determines whether the destination address in the DOAF is associated with a device that is directly attached to the expander 110/120/130. An expander 110/120/130 that is not directly attached to the device but is part of the connection pathway will simply forward the DOAF without any modification to the next expander in the pathway, at step 302. However, when the expander 110/120/130 is directly connected to a device that matches the destination address in the DOAF, the process continues to step 310 where the expander 110/120/130 next determines whether the destination device has an open request (i.e. OAF) on a partial pathway.

When the destination device has an outgoing request on a partial pathway, the method proceeds to step 312 and the DOAF is updated. In one embodiment, the expander updates the DOAF by replacing the source and destination addresses in the received DOAF with the source and destination addresses that are associated with its outgoing pending request (i.e., OAF). Then, the process returns to step 302 and the expander 110/120/130 forwards the updated DOAF in accordance with the newly updated destination address in the DOAF. In this way, the DOAF is forwarded from expander to expander along the partial pathway until the DOAF arrives at the expander that generated the DOAF. The origin address remains unmodified as the DOAF is forwarded from expander to expander along the partial pathway. If, however, the destination device does not have an outgoing request on a partial pathway, the expander 110/120/130 drops the DOAF as deadlock conditions do not exist.

When the DOAF is received at the expander 110/120/130 that generated the DOAF, the process proceeds to step 314. At step 314, the expander 110/120/130 determines whether the deadlock indicator is valid. In one embodiment, the expander 110/120/130 determines the validity of the deadlock indicator by comparing the destination address in the DOAF with the address of the deadlock indicator (e.g., the origin address in the DOAF). When the destination address and the origin address match, the deadlock indicator is valid and the expander 110/120/130 confirms deadlock and initiates pathway recovery at step 316. When the destination address and the origin address in the DOAF do not match, the deadlock indicator is invalid and the expander 110/120/130 confirms false deadlock conditions and avoids pathway recovery at step 318.

Figure 4:
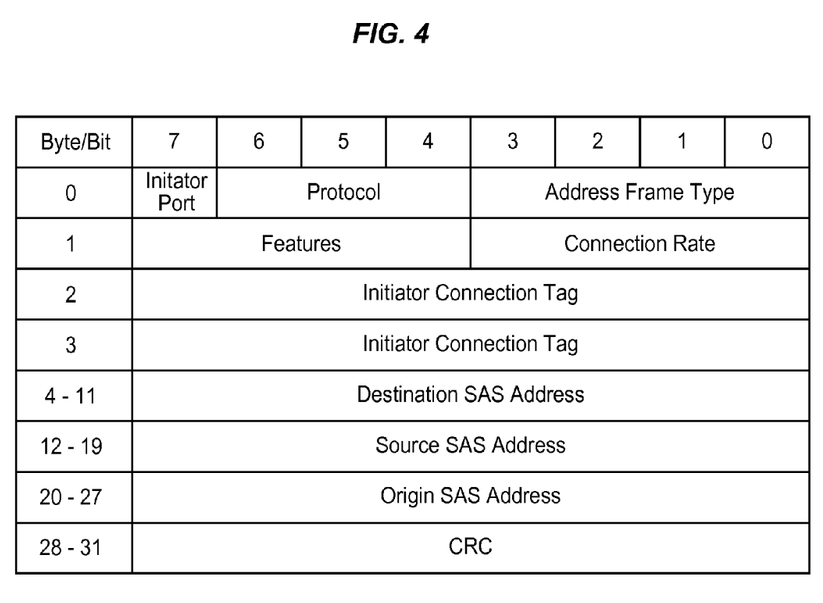
FIG. 4 is a block diagram of an exemplary modified Open Address Frame.

FIG. 4 is a block diagram of an exemplary modified Open Address Frame. Bytes 20-27 in a typical Open Address Frame are replaced with an origin address field to create the modified Open Address Frame (i.e., DOAF). Fields that traditionally comprise bytes 20-27 of an OAF, such as the source zone group, pathway block count and arbitration wait time may be replaced by a new origin address field included in the DOAF. The origin address may also be referred to as a deadlock indicator. In one embodiment, the origin address field is created by the expander 110/120/130 when a blocked partial path status is detected. The origin address is set to the address of the source device awaiting a response on that partial path and remains unchanged as the DOAF is forwarded (and the source and destination addresses are changed) from expander 110/120/130 to expander 110/120/130.

Example 1

True Deadlock Detection

Figure 5:
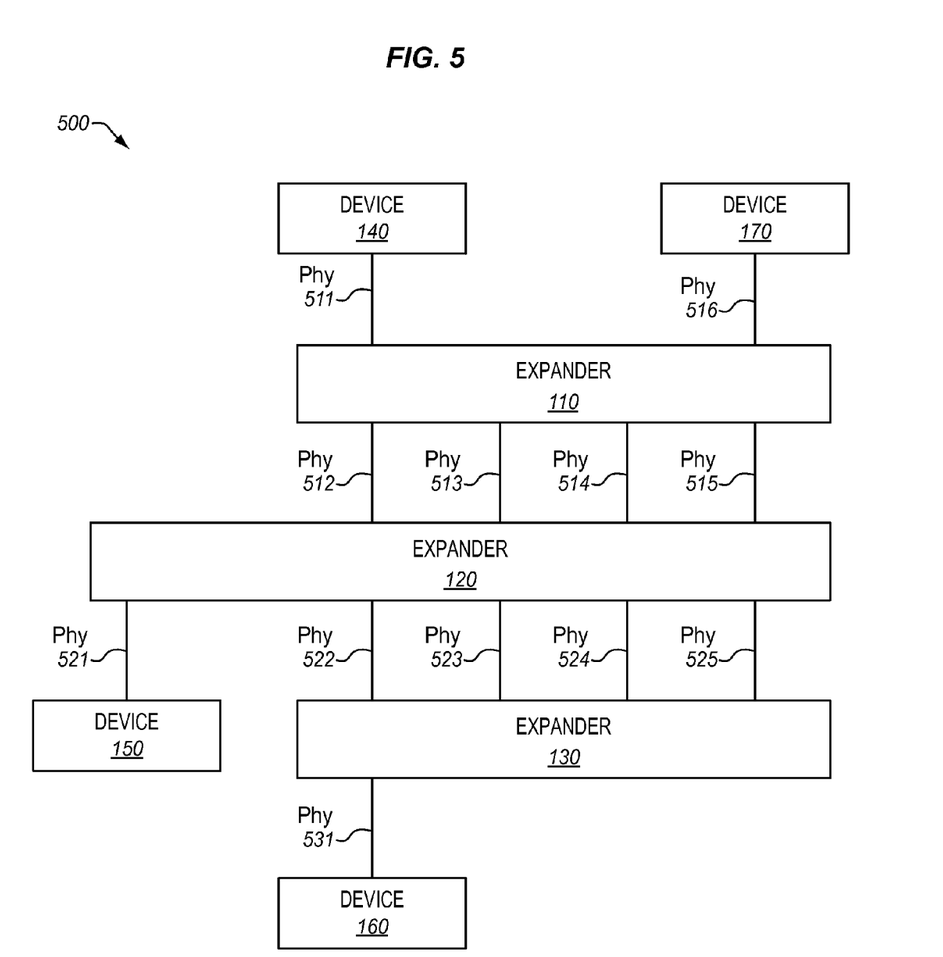
FIG. 5 is another block diagram of an exemplary SAS architecture 500.

FIG. 5 is another block diagram of an exemplary SAS architecture 500. Assume for the embodiment of FIG. 5 that device 140 attached to expander 110 at phy 511 has sent an open request (i.e., OAF) through phy 512 to device 150 attached to expander 120 at phy 521. Further, device 150 has sent an OAF to device 160 attached to expander 130 at phy 531 with the OAF routed through phy 522. Still further, device 160 has sent an OAF to device 140 attached to expander 110, with OAF routed through phy 515. As expander 110 is waiting on an open response from device 150, phy 515 of expander 110 receives Arbitrating (Waiting on Partial) confirmations from the ECM of expander 110. When AIP is received by expander 110 on phy 512 in response to the OAF, phy 515 receives Arbitrating (Blocked on Partial) confirmations from the ECM of expander 110.

In response to the Blocked on Partial status, the expander 110 sends a deadlock open address frame (DOAF) on its partial pathway for every received AIP on that partial pathway. In other words, expander 110 sends a DOAF through phy 512 to expander 120. The DOAF has a source SAS address of device 140 and a destination SAS address of device 150 (i.e., set to the source and destination addresses in the OAF that device 140 previously sent to device 150). Additionally, the DOAF has an origin address set to the SAS address of device 140 (i.e., address of the source phy waiting for on open response on the partial path). In one embodiment, the DOAF is generated by replacing bytes 20-27 of the previously sent OAF with the origin address, as shown in FIG. 4.

When expander 120 receives the DOAF from expander 110, it updates the DOAF by replacing the source SAS address and the destination SAS address in the DOAF with the corresponding SAS addresses present in the outgoing open request from the destination device in expander 120. Since in this case device 150 has sent an OAF to device 160, expander 120 updates the DOAF so that the source SAS address is set to device 150 and the destination SAS address is set to device 160. The origin SAS address will remain the same as SAS address of device 140. The DOAF is then forwarded on the partial pathway.

When expander 130 receives the DOAF from expander 120, it similarly updates the source SAS address and the destination address in the DOAF with the source and destination addresses of the current pending request. Thus, the DOAF source SAS address is updated to device 160, and the DOAF destination SAS address is updated to device 140. When expander 110 receives the DOAF with destination SAS address of device 140 (which is directly attached to its phy 511 and awaiting an open response), it compares the destination SAS address in the DOAF with the origin SAS address (also set to the SAS address of device 140) in the DOAF. Since in this case the two addresses are the same, the deadlock condition is detected and expander 110 triggers the deadlock recovery. Expander 120 and 130 are similarly operable to detect deadlock on trigger recovery.

Example 2

False Deadlock Detection

Figure 6:
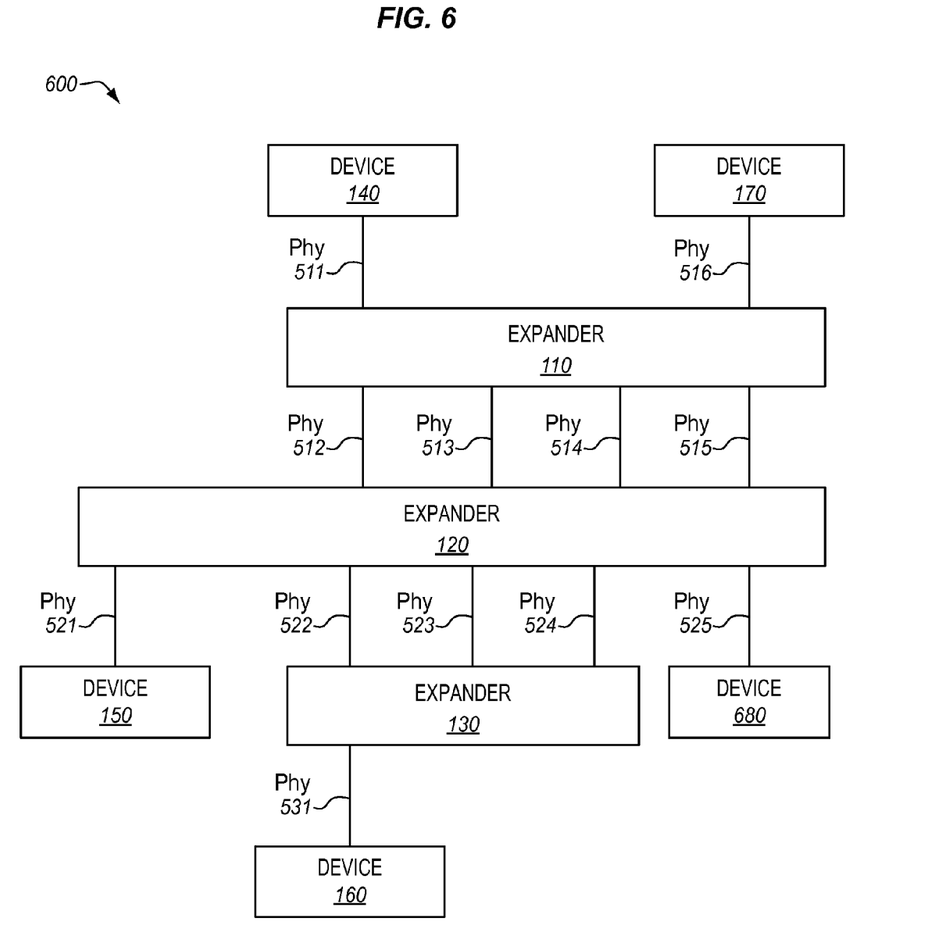
FIG. 6 is another block diagram of an exemplary SAS architecture 600.

FIG. 6 is another block diagram of an exemplary SAS architecture 600. Assume for the embodiment of FIG. 6 that device 140 attached to expander 110 at phy 511 has sent an OAF through phy 512 to device 150 attached to expander 120 at phy 521. Further, device 150 has sent an OAF to device 160 attached to expander 130 at phy 531 with the OAF routed through phy 522. Still further, device 160 has sent an OAF to device 170 attached to expander 110 at phy 516 with the OAF routed through phy 514 of expander 110. Also, device 680 has sent an OAF to device 140 attached to expander 510 at phy 511 with the OAF routed through phy 515. As expander 110 is waiting on an open response from device 150, phy 515 of expander 110 receives Arbitrating (Waiting on Partial) confirmations from the ECM of expander 110. When AIP is received by expander 110 on phy 512 in response to the OAF, phy 515 receives Arbitrating (Blocked on Partial) confirmations from the ECM of expander 110.

In response to the Blocked on Partial status, the expander 110 sends a deadlock open address frame (DOAF) on its partial pathway for every received AIP on that partial pathway. In other words, expander 110 sends a DOAF through phy 512 to expander 120. The DOAF has a source SAS address of device 140 and a destination SAS address of device 150 (i.e., set to the source and destination addresses in the OAF that device 140 previously sent to device 150). Additionally, the DOAF has an origin address set to the SAS address of device 140 (i.e., address of the source phy waiting for on open response on the partial path). In one embodiment, the DOAF is generated by replacing bytes 20-27 of the previously sent OAF with the origin address, as shown in FIG. 4.

When expander 120 receives the DOAF from expander 110, it updates the DOAF by replacing the source SAS address and the destination SAS address in the DOAF with the corresponding SAS addresses present in the outgoing open request from the destination device in expander 120. Since in this case device 150 has sent an OAF to device 160, expander 120 updates the DOAF so that the source SAS address is set to device 150 and the destination SAS address is set to device 160. The origin SAS address will remain the same as SAS address of device 140. The DOAF is then forwarded on the partial pathway.

When expander 130 receives the DOAF from expander 120, it similarly updates the source SAS address and the destination address in the DOAF with the source and destination addresses of the current pending request. Thus, the DOAF source SAS address is updated to device 160, and the DOAF destination SAS address is updated to device 170. When expander 110 receives the DOAF with destination SAS address of device 170 (which is directly attached to its phy 516) it compares the destination SAS address (set to the address of device 170) in the DOAF with the origin SAS address (set to the address of device 140) in the DOAF. Since in this case the two addresses do not match, a false deadlock condition is detected and expander 110 avoids initiating a deadlock recovery. Expander 120 and 130 are similarly operable to detect false deadlock conditions.

Figure 7:
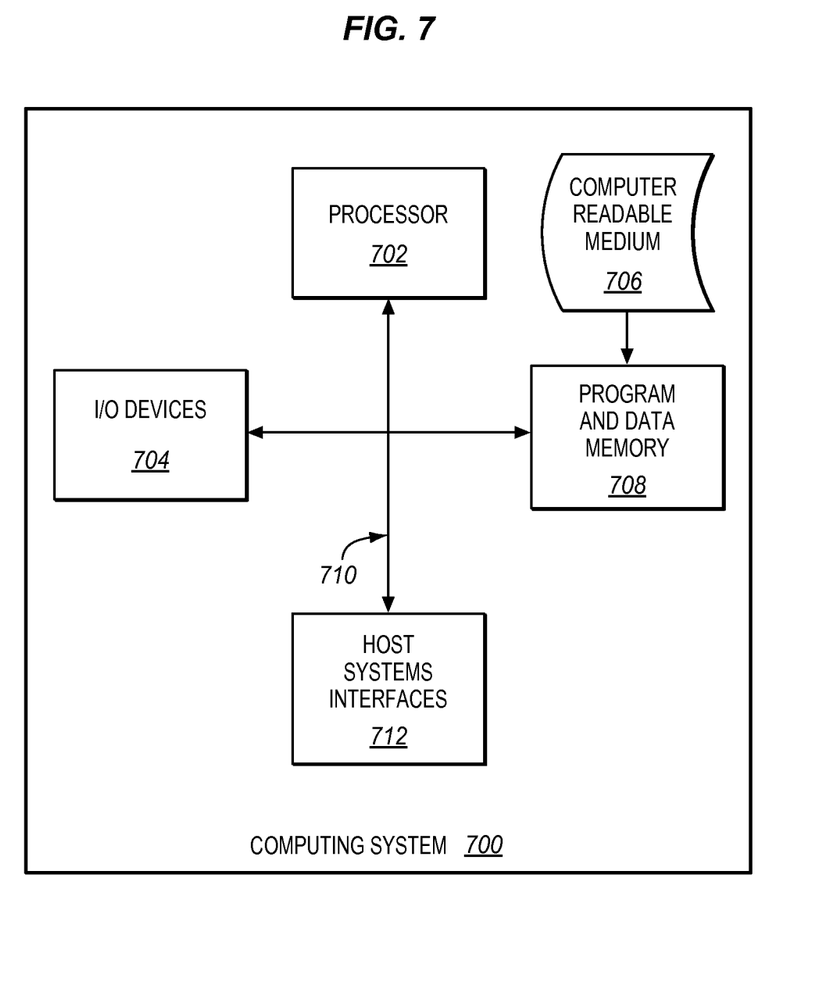
FIG. 7 illustrates a computing system in which a computer readable medium provides instructions for performing methods herein.

Embodiments of the invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 7 illustrates a computing system 700 in which a computer readable medium 706 provides instructions for performing any of the methods disclosed herein.

Furthermore, embodiments of the invention can take the form of a computer program product accessible from the computer readable medium 706 providing program code for use by or in connection with a computer or any instruction execution system. For the purposes of this description, the computer readable medium 706 can be any apparatus that can tangibly store the program for use by or in connection with the instruction execution system, apparatus, or device, including the computing system 700.

The medium 706 can be any tangible electronic, magnetic, optical, electromagnetic, infrared, or semiconductor system (or apparatus or device). Examples of a computer readable medium 706 include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The computing system 700, suitable for storing and/or executing program code, can include one or more processors 702 coupled directly or indirectly to memory 708 through a system bus 710. The memory 708 can include local memory employed during actual execution of the program code, bulk storage, and cache memories which provide temporary storage of at least some program code in order to reduce the number of times code is retrieved from bulk storage during execution. Input/output or I/O devices 704 (including but not limited to keyboards, displays, pointing devices, etc.) can be coupled to the system either directly or through intervening I/O controllers. Network adapters may also be coupled to the system to enable the data processing system to become coupled to other data processing systems, such as through host systems interfaces 712, or remote printers or storage devices through intervening private or public networks. Modems, cable modem and Ethernet cards are just a few of the currently available types of network adapters.

What is claimed is:

1. A Serial Attached Small Computer System Interface expander operable to interconnect a destination device to a source device through a plurality of physical transceivers, the expander comprising a processor operable to:
   detect an Open Address Frame associated with a connection request from the source device to the destination device, the Open Address Frame including a source address and a destination address associated with the source device and the destination device, respectively;
   receive an arbitration in progress status on a partial pathway associated with the connection request;
   modify the Open Address Frame to include a deadlock indicator;
   forward the modified Open Address Frame on the partial pathway;
   receive the modified Open Address Frame on the partial pathway; and
   initiate pathway recovery upon determination that the deadlock indicator is valid.

2. The expander of claim 1, the processor further operable to:
   avoid pathway recovery upon determination that the deadlock indicator is invalid.

3. The expander of claim 1, wherein:
   the deadlock indicator comprises an origin address associated with the source device; and
   the modification of the Open Address Frame comprises:
      replace one or more of Source Zone Group field, Pathway Block Count field and Arbitration Wait Time Field with the origin address.

4. The expander of claim 3, the processor further operable to:
   compare the origin address to the destination address; and
   determine that the deadlock indicator is valid when the destination address and the origin address match.

5. The expander of claim 4, the processor further operable to:
   determine that the deadlock indicator is invalid when the destination address and the origin address do not match.

6. The expander of claim 1, the processor further operable to:
   update the modified Open Address Frame with a pending source address and a pending destination address; and
   forward the modified Open Address Frame.

7. The expander of claim 6, wherein the update comprises:
   replace the source address in the modified Open Address Frame with the pending source address; and
   replace the destination address in the modified Open Address Frame with the pending destination address.

8. A method, comprising:
   detecting an Open Address Frame associated with a connection request from a source device to a destination device, the Open Address Frame including a source address and a destination address associated with the source device and the destination device, respectively;
   receiving an arbitration in progress status on a partial pathway associated with the connection request;
   modifying the Open Address Frame to include a deadlock indicator;
   forwarding the modified Open Address Frame on the partial pathway;
   receiving the modified Open Address Frame on the partial pathway; and
   initiating pathway recovery upon determining that the deadlock indicator is valid.

9. The method of claim 8, further comprising:
   avoiding pathway recovery upon determining that the deadlock indicator is invalid.

10. The method of claim 8, wherein:
    the deadlock indicator comprises an origin address associated with the source device; and
    the act of modifying the Open Address Frame comprises:
       replacing one or more of Source Zone Group field, Pathway Block Count field and Arbitration Wait Time Field with the origin address.

11. The method of claim 10, further comprising:
    comparing the origin address to the destination address; and
    determining that the deadlock indicator is valid when the destination address and the origin address match.

12. The method of claim 11, further comprising:
    determining that the deadlock indicator is invalid when the destination address and the origin address do not match.

13. The method of claim 8, further comprising:
    updating the modified Open Address Frame with a pending source address and a pending destination address; and
    forwarding the modified Open Address Frame.

14. The method of claim 13, wherein the act of updating comprises:
    replacing the source address in the modified Open Address Frame with the pending source address; and
    replacing the destination address in the modified Open Address Frame with the pending destination address.

15. A non-transitory computer readable medium embodying programmed instructions which, when executed by a processor, are operable to perform the steps of:
    detecting an Open Address Frame associated with a connection request from a source device to a destination device, the Open Address Frame including a source address and a destination address associated with the source device and the destination device, respectively;
    receiving an arbitration in progress status on a partial pathway associated with the connection request;
    modifying the Open Address Frame to include a deadlock indicator;
    forwarding the modified Open Address Frame on the partial pathway;
    receiving the modified Open Address Frame on the partial pathway; and
    initiating pathway recovery upon determining that the deadlock indicator is valid.

16. The medium of claim 15, further comprising:
    avoiding pathway recovery upon determining that the deadlock indicator is invalid.

17. The medium of claim 15, wherein:
the deadlock indicator comprises an origin address associated with the source device; and
the act of modifying the Open Address Frame comprises:
replacing one or more of Source Zone Group field, Pathway Block Count field and Arbitration Wait Time Field with the origin address.

18. The medium of claim 17, further comprising:
comparing the origin address to the destination address; and
determining that the deadlock indicator is valid when the destination address and the origin address match.

19. The medium of claim 18, further comprising:
determining that the deadlock indicator is invalid when the destination address and the origin address do not match.

20. The medium of claim 15, further comprising:
updating the modified Open Address Frame with a pending source address and a pending destination address; and
forwarding the modified Open Address Frame.

* * * * *